(12) United States Patent  
Gal et al.

(10) Patent No.: US 7,130,244 B2
(45) Date of Patent: Oct. 31, 2006

(54) DEVICE AND METHOD FOR ADAPTIVE ULTRASOUND SENSING

(76) Inventors: Eli Gal, 2285 St. Mathieu, Apt. 1507, Montreal, Quebec (CA) H3H 2J7; Uri Agam, 3475 De la Montagne. Apt 1725, Montreal, Quebec (CA) H3G 2A4

( * ) Notice: Subject to any disclaimer, the term of this patent is extended or adjusted under 35 U.S.C. 154(b) by 205 days.

(21) Appl. No.: 10/744,047

(22) Filed: Dec. 24, 2003

(65) Prior Publication Data

US 2004/0136270 A1    Jul. 15, 2004

Related U.S. Application Data

(60) Provisional application No. 60/436,455, filed on Dec. 27, 2002.

(51) Int. Cl.
  *G01S 15/00* (2006.01)

(52) U.S. Cl. .................... 367/98; 367/99; 367/909

(58) Field of Classification Search ................ 367/98, 367/99, 909
  See application file for complete search history.

(56) References Cited

U.S. PATENT DOCUMENTS

| | | | |
|---|---|---|---|
| 2,826,753 A | 3/1958 | Chapin | |
| 4,029,176 A | 6/1977 | Mills | |
| RE30,719 E | 8/1981 | Mills | |
| 4,590,410 A | 5/1986 | Jonsson | |
| 4,779,240 A | 10/1988 | Dorr et al. | |
| 4,975,889 A * | 12/1990 | Petrucelli et al. | ............. 367/98 |
| 4,976,337 A | 12/1990 | Trett | |
| 5,001,557 A | 3/1991 | Begle | |
| RE33,668 E | 8/1991 | Gray | |
| 5,149,921 A | 9/1992 | Picado | |
| 5,276,391 A | 1/1994 | Jonsson | |
| 5,319,611 A | 6/1994 | Korba | |
| 5,337,289 A | 8/1994 | Fasching et al. | |
| 5,339,075 A | 8/1994 | Abst et al. | |
| 5,341,344 A | 8/1994 | O'Brien et al. | |
| 5,373,482 A | 12/1994 | Gauthier | |
| 5,412,297 A | 5/1995 | Clark et al. | |
| 5,420,430 A | 5/1995 | Trett | |
| 5,450,057 A | 9/1995 | Watanable | |
| 5,467,072 A | 11/1995 | Michael | |
| 5,488,377 A * | 1/1996 | Reynolds et al. | ............. 367/98 |
| 6,344,642 B1 | 2/2002 | Agam et al. | |
| 6,466,514 B1 * | 10/2002 | Kabel | ........................... 367/98 |
| 6,870,792 B1 * | 3/2005 | Chiappetta | ................... 367/98 |

* cited by examiner

*Primary Examiner*—Ian J. Lobo
(74) *Attorney, Agent, or Firm*—Agence de Brevets Fournier

(57) ABSTRACT

The adaptive system and method for ultrasound sensing comprises re-evaluating over time the detection threshold for predetermined sensing positions along the scanning direction to cope for the static target and environment changes at the sensing positions. The method includes comparing the measured echo value at each sensing position to a reference echo value corresponding to the same sensing position, and to iteratively determine a new reference value whenever the echo value is greater than the reference echo value and that the difference between the measured echo value and the reference echo value is lower than a detection assurance factor. The use of the adaptive ultrasound sensing system and method allows locating the sensor at different location without requiring a new calibration thereof, since the sensor learns the clutter dynamically and the detection thresholds are being built accordingly without being dependent on the environment in which the sensor is located.

9 Claims, 3 Drawing Sheets

DEVICE AND METHOD FOR ADAPTIVE ULTRASOUND SENSING

This application claims the benifit of Provisional Application No. 60/436,455, filed Dec. 27, 2002.

FIELD OF THE INVENTION

The present invention relates to ultrasound sensing devices. More specifically, the present invention is concerned with a method and device for adaptive ultrasound sensing which finds applications, for example, in automatic door apparatus, bus and train doors safety sensors, machine tools, automatic self checkout systems, security sensors for valuables, and various proximity sensing systems.

BACKGROUND OF THE INVENTION

Automatic doors are in widespread use in various applications, such as elevators, buses, and trains. Considerations of personal safety require that doors are not to be closed when there is a danger that a person might be impacted thereby. While not compromising safety considerations, considerations of efficiency dictate that doors must be closed as promptly and quickly as possible. At the same time it is important that sensors, causing doors to close or alarming security systems to operate, should enable small changes in the environment and fixed patterns existence.

There exist various techniques and apparatus for sensing the existence of a person and his accouterments within a predefined zone and consequently operating an automatic door.

The following U.S. patents exemplify the state of the art:

| No. | Title | Date | Inventor(s) |
|---|---|---|---|
| 2,826,753 | Object Detectors | Apr. 13, 1954 | Chapin |
| 4,029,176 | Doorway Safety Device | Jun. 14, 1977 | Gerald |
| 4,590,410 | Object Sensing Apparatus | May 20, 1986 | Jonsson |
| 4,779,240 | Ultrasonic Sensor System | Oct. 18, 1988 | Dorr et al. |
| 4,976,337 | Proximity Detection Systems | Dec. 11, 1990 | Trett |
| 5,001,557 | Method of, and Apparatus for, Controlling the Position of an Automatically Operated Door | Mar. 19, 1991 | Begle |
| 5,149,921 | Self Correcting Infrared Intrusion Detection System | Sep. 22, 1992 | Picado |
| 5,276,391 | Door Mounted Safety Apparatus | Jan. 4, 1994 | Jonsson |
| 5,337,289 | Phased-Array Ultrasonic Surface Contour Mapping System and Method for Solids Hoppers and the Like | Aug. 9, 1994 | Fasching et al. |
| 5,412,297 | Monitored Radio Frequency Door Edge Sensor | May $2^{nd}$, 1995 | Clark et al. |
| 5,420,430 | Detection Systems for Detecting Obstructions in Doorways | May 30, 1995 | Trett |
| RE 33,668 | Detection Device Having Energy Transmitters Located at Vertically Spaced Apart Points Along Movable Doors | Aug. 20, 1991 | Gray |
| RE 30,719 | Doorway Safety Device | Aug. 25, 1981 | Gerald |

U.S. Pat. No. 5,412,297 teaches a tactile obstruction detector, while U.S. Pat. Nos. 4,590,410 and 5,276,391 concern optical detectors. Tactile detectors are prone to suffer from a high degree of tear and ware and thus have a very low reliability. Furthermore they require physical contact and more specifically that a minimum force be applied thereon to be tripped, which makes them unsuitable for many applications. Optical sensors are sensitive to lighting conditions and do not function under daylight. Moreover, they do not allow differentiating between objects at a close proximity since such differentiation requires a measurement capability in the magnitude of the speed of light for small divergences. U.S. Pat. No. 2,826,753, relates to object detection in a confined environment and not to door opening or closing, for example.

U.S. Pat. Nos. RE 30,719, and 4,029,176 describe acoustic energy-based detectors.

Other distance and direction measuring apparatuses are described in the following U.S. patents:

| No. | Title | Date | Inventor(s) |
|---|---|---|---|
| 5,319,611 | Method of Determining Range Data in a Time-of-Flight Ranging System | Jun. 7, 1994 | Korba |
| 5,339,075 | Vehicular Collision Avoidance Apparatus | Aug. 16, 1994 | Abst et al. |
| 5,341,344 | Obstacle-Detection System | Aug. 23, 1994 | O' Brien et al. |
| 5,373,482 | Distance Measuring System Arranged to Limit False Indications of Distance Measurements | Dec. 13, 1994 | Gauthier |
| 5,450,057 | Stereophonic Warning Apparatus | Sep. 12, 1995 | Watanabe |
| 5,467,072 | Phased Array Based Radar System For Vehicular Collision Avoidance | Nov. 14, 1995 | Michael |
| 6,344,642 | Door Control Apparatus | Feb. 5, 2002 | Agam et al. |

A common problem with ultrasonic sensors from the prior art is that they do not allow covering a volume where the signal fades and varies along the path and differentiating a legitimate clutter signal from a penetration signal.

Indeed, when dealing with ultrasonic sensors or other ultrasonic devices, one has to consider the "picture" the device see, i.e. the volume that the device can detect. This volume of course, is measured in terms of electrical voltage, and will be referred to herein as the "clutter".

The clutter of a sensor includes echoes received from objects located within the sensor's beam. These objects may include static objects, which the sensor always detects, and therefore should ignore, and dynamic objects, which the sensor detects periodically when they enter its beam. Those dynamic objects are considered relevant targets and should be detected by the sensor.

A drawback of sensing methods and apparatuses from the prior art is that they do not allow discriminating between static objects and relevant targets to be detected.

OBJECTS OF THE INVENTION

An object of the present invention is therefore to provide improved device and method for ultrasound sensing.

Another object of the invention is to provide a system and method for adaptive ultrasound sensing free of the above noted drawbacks from the prior art.

SUMMARY OF THE INVENTION

More specifically, in accordance with a first aspect of the present invention, there is provided an adaptive ultrasound detecting method comprising:

emitting an ultrasound beam along a scanning direction and receiving an echo value e(i) from a number I of sensing positions i along the scanning direction;

comparing each the echo value e(i) to a detection threshold dt(i) corresponding to the sensing position (i); whereby, a detection occurs when the echo value e(i) is greater than the detection threshold dt(i); the improvement wherein at least one of the detection thresholds dt(i) is revaluated over time to cope for environment changes at sensing position (i) corresponding to the at least one of the detection thresholds dt(i).

According to a second aspect of the present invention, there is also provided a method for determining ultrasound detection thresholds along a scanning direction, the method comprising:

a) providing a reference echo (i) for each of a number I of sensing position (i) along a scanning direction;

b) providing at least one detection assurance factor;

for each sensing position (i) along the scanning direction:

c) emitting an ultrasound sensing beam along the scanning direction and receiving an echo value e(i) from the sensing positions (i);

d) comparing the echo value (i) obtained at sensing position (i) to the reference echo value (i) corresponding to the sensing position (i);

e) if the echo value (i) is lower or equal than the reference echo value (i) then the method stops, a target detection threshold for sensing position (i) being equal to the sum of the reference echo value (i) and the at least one assurance factor;

f) if the echo value (i) is greater than the reference echo value (i) then verifying whether a difference between the echo value (i) and the reference echo value (i) is lower than the detection assurance factor;

g) if the difference between the echo value (i) and the reference echo value (i) is lower than the detection assurance factor then gg1) storing the echo value (i) as the reference echo value (i) for sensing position (i) and, gg2) repeating steps c) to g);

h) if the difference between the echo value (i) and the reference echo value (i) is greater or equal than the detection assurance factor then a detection occurs and the method stops.

According to a third aspect of the present invention, there is further provided an adaptive ultrasound detecting system comprising:

an ultrasound pulse generator for generating an ultrasound pulse signal;

a transducer coupled to the ultrasound pulse signal generator for receiving the ultrasound pulse signal and for generating and ultrasound pulse and for receiving echo reflected from targets in response to the pulse;

a controller for receiving the echo from the transducer and for frequently computing a detection threshold by comparing the echo to a reference value and for re-evaluating the reference value; and a power supply connected to the pulse generator, the transducer and the controller for energizing the pulse generator, the transducer, and the controller.

Finally, in accordance to a fourth aspect of the present invention, there is provided an adaptive ultrasound detecting system comprising:

first means for generating an ultrasound pulse signal;

second means coupled to the means for generating an ultrasound pulse signal for receiving the ultrasound pulse signal and for generating and ultrasound pulse and for receiving echo reflected from targets in response to the pulse;

third means for receiving the echo from the transducer and for frequently computing a detection threshold by comparing the echo to a reference value and for re-evaluating the reference value; and fourth means connected to the first, second, and third means for energizing the first, second and third means.

The present invention is suitable for using, for example, with automatic doors, where it allows providing a secure and efficient sensing system, which maximizes sensing efficiency while minimizing the risk of injury to users.

The use of an adaptive ultrasound sensing system and method allows locating the sensor at different location without requiring a new calibration thereof, since the sensor learns the clutter dynamically and the detection thresholds are being built accordingly without being dependent on the environment in which the sensor is located.

In addition, the dynamic learning allows coping with the temperature, moisture, and wind changes.

Other objects, advantages and features of the present invention will become more apparent upon reading the following non restrictive description of preferred embodiments thereof, given by way of example only with reference to the accompanying drawings.

DETAILED DESCRIPTION OF THE INVENTION

Figure 1:
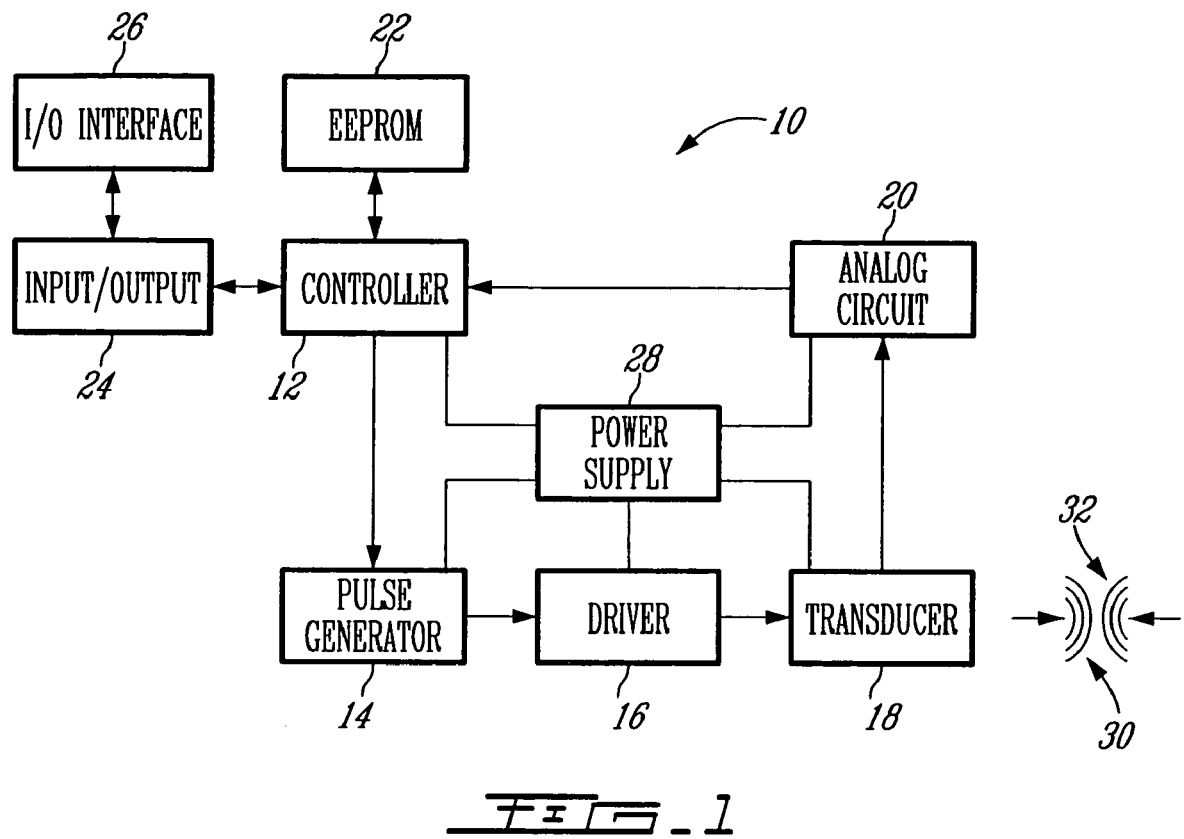
FIG. 1 is a block diagram of an adaptive ultrasound detecting system according to an illustrative embodiment of a first aspect of the present invention.

Turning now to FIG. 1 of the appended drawings, an adaptive ultrasound detecting system 10 according to an illustrative embodiment of the present invention will be described.

The detecting system 10 comprises a controller 12, a pulse generator 14 coupled to the controller 12, a sensor driver 16 coupled to the pulse generator 14, a transducer 18 coupled to the driver 16, an analog circuit 20 coupled to both the transducer 18 and to the controller 12, a memory means in the from of an EEPROM (Electrically Erasable Programmable Read Only Memory) 22 coupled to the controller 12, input/output (I/O) means 24, and an I/O interface coupled to the I/O means 24. The controller 12, pulse generator 14, sensor driver 16, transducer 18, and analog circuit 20 are connected to a power supply 28, in the form of a 12–24 DC (Direct Current) voltage source. Of course, the power supply 28 may take other forms allowing energizing the system 10.

The pulse generator 14 includes an oscillating circuit and allows generating a pulsed signal having a frequency above the range of human hearing. This pulsed signal is amplified to the appropriate voltage and driven to the transducer 18 by the sensor driver 16. The transducer 18 converts the voltage from the driver 16 to an ultrasonic pulse 30 that propagates through the air and reflects back in the form of an echo 32 to the transducer 18 from an object or another target (not shown).

The transducer 18 converts the reflected pressure wave (or echo) 32 into an echo voltage, which is amplified and filtered by the analog circuit 20. The echo voltage is then digitized and compared by the controller 12 to a reference voltage stored in the EEPROM 22 to assess the presence of a relevant target within the field of view 34 (see FIG. 2) of the detecting system 10 as will be explained hereinbelow in more detail. The controller 12 is configured to drive the transducer 18 via the pulse generator 14 and driver 16 to emit ultrasound wave pulses at a selected frequency and to collect echos at different period of time.

The controller 12 is further configured to generate an output signal indicative of the presence of a target and to output this signal to the I/O interface 26 via the I/O means 24.

The controller 12 may take many forms, from an electronic circuit to a dedicated microchip or a programmed computer.

Of course, the memory 22 may also take other forms, such as a computer hard drive, a memory card used in connection with a memory card reader, a Read-Only Memory, etc.

The detection system 10 is enclosed in a casing (not shown), including an opening for the ultrasonic pulse, for protecting the detecting system 10 and for allowing its mounted on a structure (not shown).

Since, pulse generators, sensor drivers, transducers, EEPROM, I/O means and interfaces are believed to be well known in the art, they will not be described herein in more detail.

The detection system 10 may have other configuration allowing to implement an adaptive ultrasound detecting method according to the present invention as will be described hereinbelow in more detail.

Figure 2:
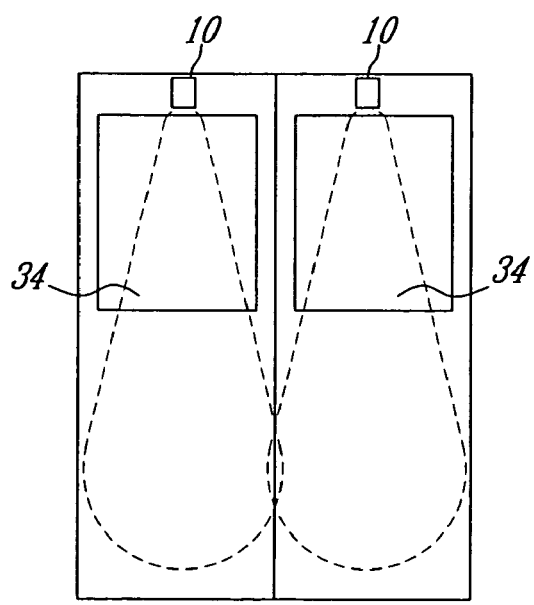
FIG. 2 is a schematic view illustrating two ultrasound detecting systems from FIG. 1, positioned adjacent to one another.

As illustrated in FIG. 2, a series of detecting systems 10 may be mounted adjacent and/or parallel so as to cover more spaces and so as to provide overlapping fields of view 34. Detection systems 10 may be positioned according to other configurations depending on the application.

Alternatively, a first transducer (not shown) can be used to emit an ultrasound wave pulse, and a second transducer (not shown) can be used to receive the reflected pulse. Of course, in that case, the first transducer is coupled to the driver 16 with a pulse generator 14, and the second transducer is coupled to an analog circuit 20.

According to further embodiments, a detection system according to the present invention may plurality of transducers 18 connected to the same controller and selectively driven therefrom.

An adaptive ultrasound detecting method 100 will now be described with reference to FIGS. 3 and 4.

Figure 3:
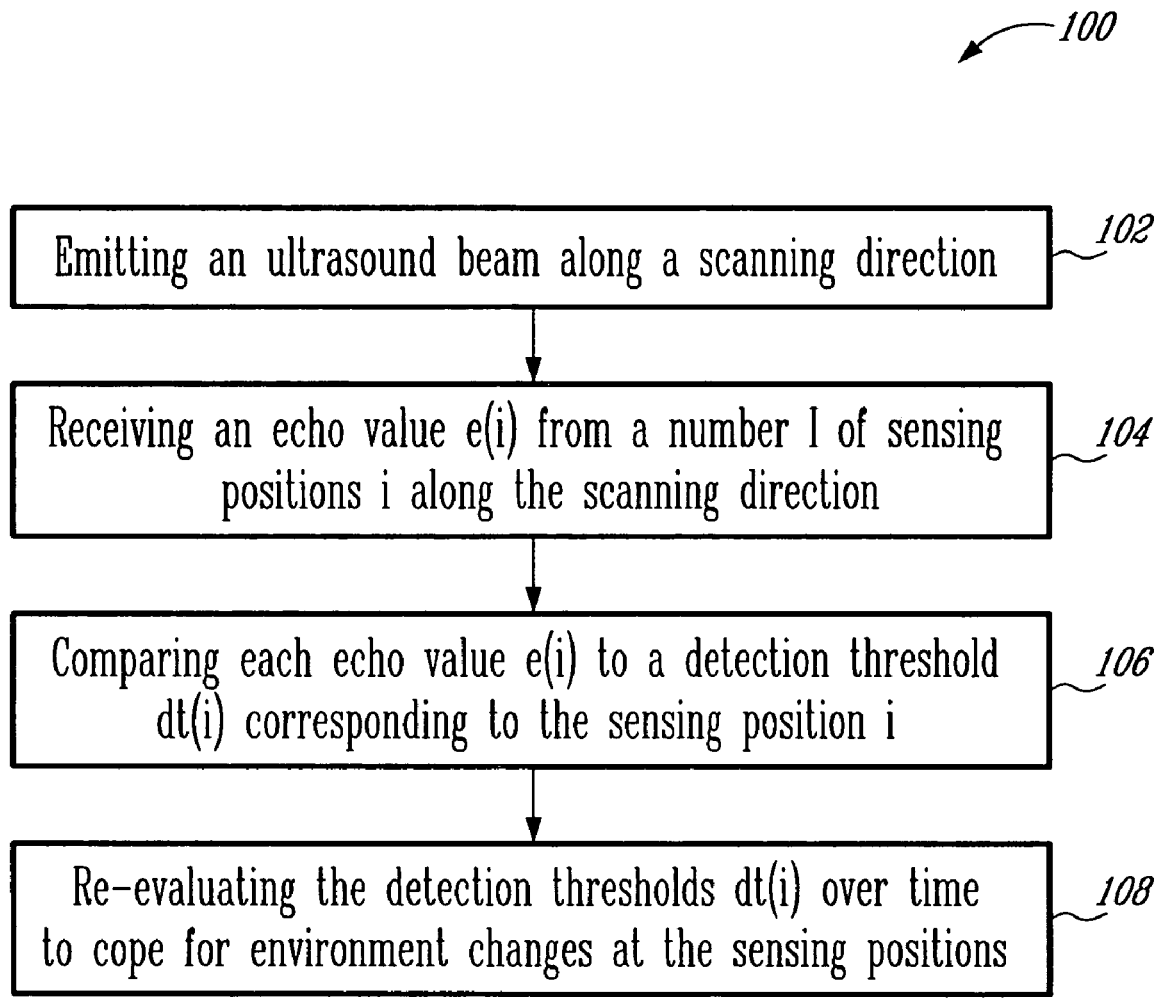
FIG. 3 is a flowchart of an adaptive ultrasound detecting method according to an illustrative embodiment of a second aspect of the present invention.

As illustrated in FIG. 3, the method 100 includes emitting an ultrasound beam along a scanning direction (step 102), receiving an echo value e(i) from a number I of sensing positions (i) along the scanning direction (step 104), and comparing each echo value e(i) to a detection threshold dt(i) corresponding to the sensing position (i) (step 106). A detection occurs when one of the echo values e(i) is greater than the detection threshold dt(i) for that position (i).

The detection thresholds dt(i) for the different positions (i) along the scanning direction are stored in the EEPROM 22 and are retrieved by the controller 12 for comparison purposes.

The number and locations of the sensing positions (i) may of course vary depending on the required resolution globally and also locally. Indeed, even though the sensing positions (i) are equally distanced in most applications, they may also be unevenly distanced from the detecting system 10.

As it is commonly known in the art, the distance position corresponding to an echo is being calculated by measuring the delay between the time a wave pulse is emitted by the detecting system 10 and the time a corresponding echo is received.

An interrupt module of the controller 12 allows to evaluate the delay and to compute the positions corresponding to the echos.

Since interrupt modules and ultrasound detecting time delays are believed to be well known in the art, they will not be described herein in more detail.

The thresholds dt(i) correspond to voltage values suitable for comparison with voltage values produced by the transducer 18 in response to its reception of an echo 32 following the emission of an ultrasound wave pulse 30.

The method 100 further comprising at least one detection threshold dt(i) being revaluated overtime to cope for environment changes or configuration in static targets at sensing position (i).

Even though it is often more reliable to re-evaluate the thresholds dt(i) at all the sensing positions, in some applications it might be unnecessary to do so due to environment stability at some of the sensing positions.

Re-evaluating the thresholds dt(i) over time allows to cope for changes in the static targets configuration. Such static targets includes phenomenon that may cause changes in the voltage level of the received echos but do not correspond to an actual target to be detected. Static targets allow taking into consideration electrical noise caused by the detection system 10.

Figure 4:
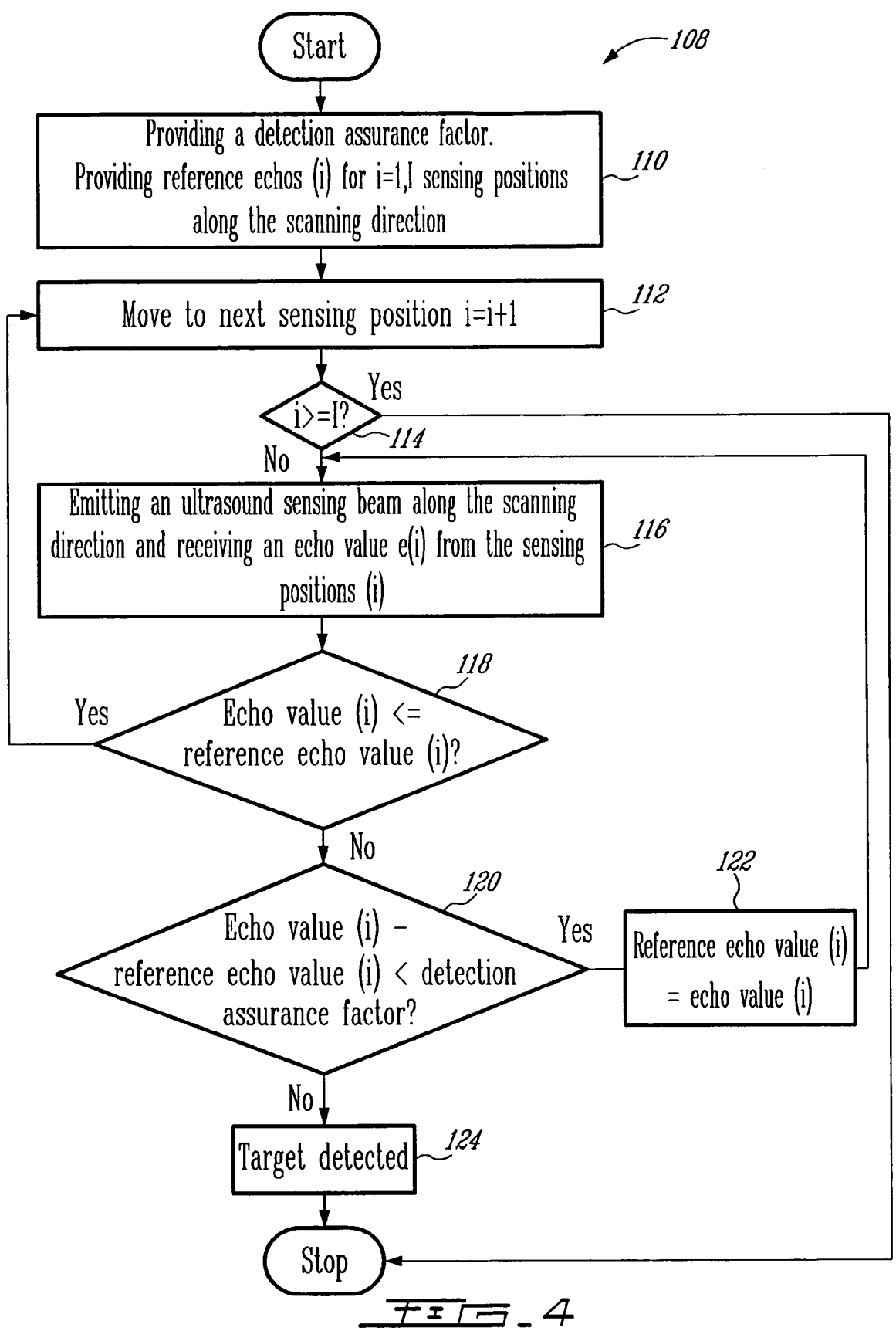
FIG. 4 is a flowchart of an ultrasound detecting method threshold builder according to an illustrative embodiment of a third aspect of the present invention.

Turning now to FIG. 4, a method for determining ultrasound detection thresholds along a scanning direction is illustrated. It is to be noted such method corresponds to step 108 in FIG. 3.

In step 110, reference echos (i) for each of the number I of sensing positions (i) along the scanning direction are provided. A detection assurance factor is also provided. The detection threshold dt(i) at the sensing position (i) equals the sum of the reference echo (i) at that position and the assurance factor.

The assurance factor serves to minimize false detections caused by an echo signal from the background, i.e. not being caused by an actual target to be detected, being greater than the threshold. The assurance factor is selected so as to yield a margin over the measured voltage sufficient to minimize the tripping of the detection system 10 by noised signal.

In some applications, it is appropriate to provide more than one assurance factor, such as a predetermined assurance factor for each sensing position.

Step 112 allows iterating on all the sensing position. In step 114, it is verified whether all the scanning positions have been processed. If all the thresholds have been re-evaluated for each sensing position, the method stops until a new re-evaluation of the thresholds.

The frequency and timing of the detection threshold evaluation (method 108) may vary. For example, a cycle may be established wherein the evaluation of the detection thresholds for all sensing positions alternates with the actual detection. Alternatively, the evaluation of the threshold for each position may be performed concurrently with the detection at each sensing position, as will be described hereinbelow. Of course, other detection threshold evaluation timing may be established.

In step 116, an ultrasound sensing beam is emitted along the scanning direction and an echo e(i) corresponding to the sensing position (i) is received. The echo (i) is received in the form of a voltage value.

The echo (i) received for the distance corresponding to the current sensing position (i) is compared by the controller 12 to the reference echo (i) corresponding to the same distance from the detecting system 10 along the scanning direction (step 118), which is stored as voltage amplitude in the EEPROM 22.

If the measured echo value (i) is lower or equal than the reference echo value (i) then the method proceeds with the next sensing position (i+1) and returns to step 112. The target detection threshold for the sensing position (i) is equal to the sum of the reference echo value (i) and the assurance factor.

If the measured echo value (i) is greater than the reference echo value (i), then verification is performed as to whether the difference between the echo value (i) and the reference echo value (i) exceeds the detection assurance factor. If this is the case, then it means that an actual target has been detected (step 124) and the method stops. The method 100 then proceeds with the controller 12 sending an output signal via the I/O means 24 indicative of target detection. If not, than an iterative process begins where a) the echo value (i) is stored on the memory 22 as the new reference echo value (i) for the current sensing position (step 122), and b) steps 116–120 are repeated until the measured echo value (i) is lower or equal to the reference echo value (i).

The system 10 and method 100 can be implemented as stand-alone application. For example, the detecting system (sensor) 10, may be used as a proximity sensor to protect a valuable object, such as a work of art, where the detection threshold is re-evaluated from time to time to minimize false alarms, while providing high sensibility.

The method 100 can also be embedded in another application, in its initialization stage for example. It can be used, for example, to improve the performance of a sensor in automatic checkout systems where a sensor is mounted on the tip of the checkout for scanning its front in order to detect customers approaching the checkout. In that case, the method 108 may be used to build the detection thresholds upon a reset or power-on of the checkout system.

Other applications of a system and method according to the present invention include, without being restricted to, proximity detections in automation process, and security sensors for robotic or machinery.

Of course, a system and method according to the present invention can be used in door control apparatus for automatic doors.

Although the present invention has been described hereinabove by way of preferred embodiments thereof, it can be modified without departing from the spirit and nature of the subject invention, as defined in the appended claims.

What is claimed is:

1. An adaptive ultrasound detecting method comprising:
    emitting an ultrasound beam along a scanning direction and receiving an echo value e(i) from a number I of sensing positions p(i) along said scanning direction;
    comparing each said echo value e(i) to a detection threshold dt(i) corresponding to said sensing position p(i);
    whereby a detection occurs when said echo value e(i) is greater than said detection threshold dt(i);
    the improvement wherein at least one of said detection thresholds dt(i) is revaluated over time to cope for environment changes at sensing position p(i) corresponding to said at least one of said detection thresholds dt(i), wherein at least one detection assurance factor is provided, at least one of said detection thresholds dt(i) being revaluated over time including:
    a) emitting an ultrasound sensing beam along the scanning direction and receiving an echo value e(i) from said sensing position p(i) corresponding to said at least one of said detection thresholds dt(i);
    b) comparing said echo value e(i) obtained at sensing position p(i) to a reference echo value r(i) corresponding to said sensing position p(i);
    c) if said echo value e(i) is lower than or equal to said reference echo value r(i) then the method stops;
    d) if said echo value e(i) is greater than said reference echo value r(i) then verifying whether a difference between said echo value e(i) and said reference echo value r(i) is greater than said detection safety factor;
    e) if said difference between said echo value e(i) and said reference echo value r(i) is lower than said detection assurance factor then ee1) storing said echo value e(i) as said reference echo value r(i) for sensing position p(i), and, ee2) repeating steps a) to e); and
    f) if said difference between said echo value e(i) and said reference echo value r(i) is greater than or equal to said detection safety factor then a detection occurs and the method stops.

2. A method as recited in claim 1, wherein said echo value e(i) and said reference echo value r(i) are in the form of voltage values.

3. A method as recited in claim 1, wherein all of said detection thresholds dt(i) are revaluated over time.

4. A method as recited in claim 1, wherein a plurality of assurance factors is provided; one of said plurality of assurance factors corresponding to each said sensing position p(i).

5. The use of a method as recited in claim 1, in one of a door control apparatus for automatic doors, a proximity detection system for automation, a self check-out system, and robotics and machinery security devices.

6. A method for determining ultrasound detection thresholds along a scanning direction, the method comprising:
    a) providing a reference echo r(i) for each of a number I of sensing position p(i) along a scanning direction;
    b) providing at least one detection assurance factor;
    for each sensing position p(i) along the scanning direction:
    c) emitting an ultrasound sensing beam along the scanning direction and receiving an echo value e(i) from said sensing positions p(i);
    d) comparing the echo value e(i) obtained at sensing position p(i) to said reference echo value r(i) corresponding to said sensing position p(i);
    e) if said echo value e(i) is lower than or equal to said reference echo value r(i) then the method stops, a target detection threshold for sensing position p(i) being equal to the sum of the reference echo value r(i) and said at least one assurance factor;

f) if said echo value e(i) is greater than said reference echo value r(i) then verifying whether a difference between said echo value e(i) and said reference echo value r(i) is lower than said detection assurance factor;

g) if said difference between said echo value e(i) and said reference echo value r(i) is lower than said detection assurance factor then gg1) storing said echo value e(i) as said reference echo value r(i) for sensing position p(i) and, gg2) repeating steps c) to g); and h) if said difference between said echo value e(i) and said reference echo value r(i) is greater than or equal to said detection assurance factor then a detection occurs and the method stops.

7. A method as recited in claim 6, wherein said sensing positions are equally distanced from one another.

8. A method as recited in claim 6, wherein said echo value e(i) and said reference echo value r(i) are in the form of voltage values.

9. A method as recited in claim 6, wherein a plurality of assurance factors are provided, one of said plurality of assurance factors corresponding to each said sensing position p(i).

* * * * *